United States Patent Office 3,304,229
Patented Feb. 14, 1967

3,304,229
COMPOSITION CONTAINING LINCOMYCIN SALT
Barney J. Magerlein, Portage Township, Kalamazoo County, Mich., assignor to The Upjohn Company, Kalamazoo, Mich., a corporation of Delaware
No Drawing. Filed Mar. 4, 1963, Ser. No. 262,367
3 Claims. (Cl. 167—65)

This invention relates to novel sulfamate salts of lincomycin and, more particularly, to lincomycin phenylsulfamate and lincomycin N-phenyl-N-alkylsulfamates and to compositions containing these salts.

Lincomycin is a recently discovered antibiotic demonstrating pronounced activity against certain Gram-positive organisms, including especially *Staphylococcus aureus, Diplococcus pneumoniae,* and the beta-hemolytic streptococci. The effectiveness of this antibiotic has been demonstrated in humans and animals against infections due to susceptible pathogens. However, the antibiotic base and the salts heretofore investigated have been characterized by disagreeable taste properties.

Both the therapeutic usefulness and pharmaceutical elegance of lincomycin compositions are enhanced by incorporation of lincomycin as the lincomycin phenylsulfamate and lincomycin N-phenyl-N-alkylsulfamates of this invention. For example, it has now been unexpectedly found that lincomycin phenylsulfamate and lincomycin N-phenyl-N-alkylsulfamates of the formula:

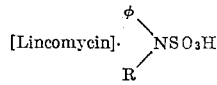

in which R is hydrogen or alkyl containing 1 through 8 carbon atoms, make possible lincomycin therapy in liquid form with the bitter taste greatly diminished. In addition, product stability is improved and a delayed release of active medicament realized from these salts. Also unexpected are the higher lincomycin blood levels obtained following administration of lincomycin phenylsulfamate and lincomycin N-phenyl-N-alkylsulfamates as compared with those obtained with lincomycin base and known lincomycin salts, such as the hydrochloride.

These novel lincomycin salts are particularly suited to oral administration in conjunction with pharmaceutical carriers in the form of capsules, tablets, and fluid suspensions (including syrups). The unit dosage forms of these compositions contain from about 100 to about 1000 mg. of the desired sulfamate salt of lincomycin. In general, liquid preparations, based on single doses of 5 ml., should contain from about 2 to about 25% lincomycin phenylsulfamate or lincomycin N-phenyl-N-alkyl-sulfamate.

Administration of the novel lincomycin salts in pharmaceutical formulations as disclosed herein can be on a schedule of from about 100 to about 1000 mg. daily given one to four times daily, depending on the patient's age, weight, condition and the nature of the infection being treated.

It is to be understood that this invention embraces, in addition to lincomycin phenylsulfamate and lincomycin N-phenyl-N-alkylsulfamates as new chemical entities, pharmaceutical compositions including such salts with or without supplementary active ingredients. The essential feature of these compositions is therefore the presence of a lincomycin sulfamate as herein defined. It is likewise to be understood that the usual adjuvants are contemplated for the solid dosage forms, such as capsules and tablets, in order to render the lincomycin phenylsulfamate or lincomycin N-phenyl-N-alkylsulfamates more adaptable to production procedures. Similarly, the fluid suspension and similar liquid preparations can include suspending agents, flavoring agents, preservatives and other materials designed to facilitate the preparation of a stable and pharmaceutically elegant product.

The preparation of the novel salts of this invention follows classic procedures in which, for example, phenylsulfamic acid or N-phenyl-N-alkylsulfamic acid is reacted with lincomycin (or the sodium salts of the said sulfamic acids with lincomycin hydrochloride) in water solution. Preparation of the lincomycin base and hydrochloride are described in South African Patent No. 2,184/62, Belgian Patent No. 619,645 and U.S. application No. 121,696, filed July 3, 1961, now U.S. Patent No. 3,086,-912.

The following examples set forth the best mode contemplated by the inventor for carrying out this invention, but these examples are not to be construed as limiting the scope thereof.

*Example 1.—Lincomycin phenylsulfamate*

Five grams of sodium phenylsulfamate and 11.18 gm. of lincomycin hydrochloride were dissolved in 20 ml. of warm water. After diluting with acetone and refrigerating, a precipitate was obtained. The precipitate was washed with water, filtered and dried to give 6.6 gm. of lincomycin phenylsulfamate, M.P. 125–133° C. (dec.).

*Example 2.—Lincomycin N-phenyl-N-methylsulfamate*

Following the procedure of Example 1 above, 1.0 gm. of sodium N-phenyl-N-methylsulfamate and 2.13 gm. of lincomycin hydrochloride were reacted in 3 ml. of water to give 0.89 gm. of lincomycin N-phenyl-N-methylsulfamate, M.P. 150° C. (dec.).

Substituting other sodium N-phenyl-N-alkylsulfamate salts for the sodium N-phenyl-N-methylsulfamate above, the alkyl groups containing 2–8 carbon atoms, gives the corresponding lincomycin N-phenyl-N-alkylsulfamate salt.

*Example 3.—Oral syrup*

One thousand milliliters of an aqueous suspension for oral use, containing in each 5 ml. 1000 mg. of lincomycin phenylsulfamate, is prepared from the following ingredients:

| | | |
|---|---|---|
| Lincomycin phenylsulfamate | gm | 200 |
| Tragacanth | gm | 3 |
| Sucrose | gm | 650 |
| Methylparaben | gm | 0.75 |
| Propylparaben | gm | 0.25 |
| Sorbic acid | gm | 1 |
| Sodium cyclamate | gm | 20 |
| Saccharin sodium | gm | 2 |
| Citric acid | gm | 2 |
| Oil of peppermint | ml | 0.25 |
| Oil of orange | ml | 0.125 |
| Cocoa | gm | 100 |
| Deionized water, q.s. | ml | 1000 |

The tragacanth, sucrose, parabens, sorbic acid, cyclamate, saccharin, citric acid and oils are dispersed in sufficient water to make 800 ml. of syrup. The finely powdered lincomycin phenylsulfamate and cocoa are stirred into the syrup until distribution is uniform. Sufficient water is added to make up the final volume.

One teaspoonful twice a day is given to adults in the treatment of infection due to *D. pneumoniae.*

*Example 4*

In Example 2 above, lincomycin N-phenyl-N-alkylsulfamates, in which the alkyl group contains 1 through 8 carbon atoms, such as lincomycin N-phenyl-N-methylsulfate, can be substituted for the lincomycin salt therein. Such compositions are employed in the same manner and for the same purposes indicated in Example 2 and as elsewhere disclosed.

What is claimed is:

1. A pharmaceutical preparation comprising: from about 100 to about 1000 mg. of a compound selected from the group consisting of lincomycin phenylsulfamate and lincomycin N-phenyl-N-alkyl-sulfamate in which the alkyl group contains 1 through 8 carbon atoms, dispersed in a pharmaceutical carrier.

2. A fluid preparation for oral administration comprising: from about 2 to about 25% lincomycin phenylsulfamate, dispersed in a liquid pharmaceutical carrier.

3. A fluid pharmaceutical preparation for oral administration comprising: from about 2 to about 25% lincomycin N-phenyl-N-methylsulfamate, dispersed in a liquid pharmaceutical carrier.

References Cited by the Examiner
UNITED STATES PATENTS 3,086,912    4/1963    Bergy _____ 167—65

SAM ROSEN, *Primary Examiner.*